2,784,202
LIQUID PHASE OXIDATION OF PROPYLENE USING AIR AND A HYDROCARBON SOLVENT

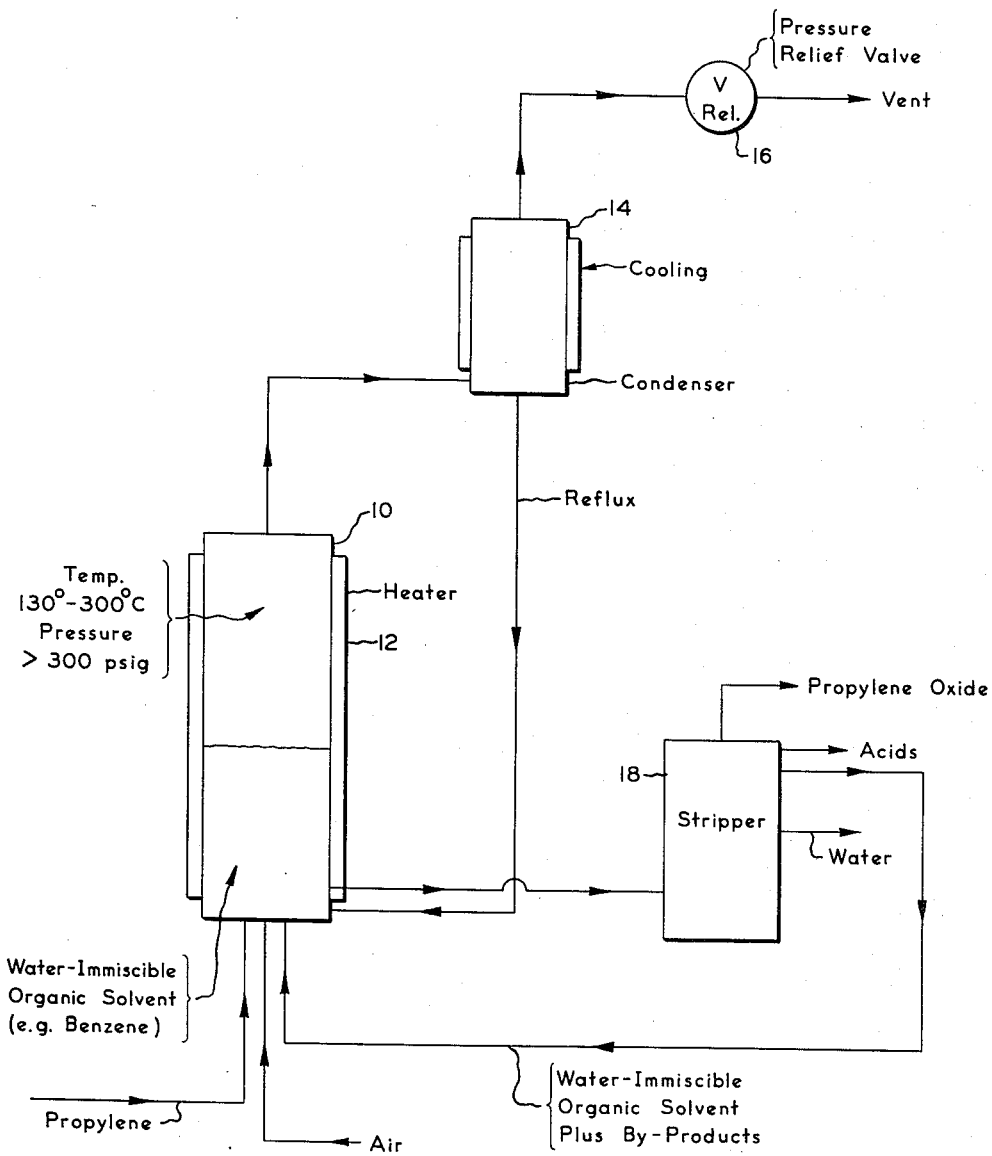

James H. Gardner, Weston, and Charles I. Tewksbury, Chestnut Hill, Mass., assignors, by mesne assignments, to Escambia Chemical Corporation, Pace, Fla., a corporation of Delaware Application February 28, 1955, Serial No. 490,919

6 Claims. (Cl. 260—348.5)

This invention relates to the production of chemicals and in particular to the production of olefin oxides.

A principal object of the present invention is to produce oxygenated hydrocarbons in good yields by the liquid phase oxidation of unsaturated hydrocarbons in a water-immiscible organic solvent with an elemental-oxygen-containing gas.

Another object of the present invention is to provide an improved process for the manufacture of olefin oxides from olefins.

Still another object of the present invention is to provide a process of the above type which is particularly adapted to the production of oxygenated hydrocarbons containing at least three carbon atoms and in particular propylene oxide.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing, which is a diagrammatic flow sheet illustrating one embodiment of the invention.

In the present invention, an unsaturated hydrocarbon containing at least three carbon atoms and above is oxidized to the corresponding olefin oxide. A specific preferred embodiment includes propylene as the olefin to be converted to propylene oxide. The invention will be initially described in connection with the oxidation of propylene without intending to limit the scope thereof.

The oxidation is preferably achieved by passing an elemental-oxygen-containing gas upwardly through a liquid phase containing dissolved propylene. This liquid phase is preferably a water-immiscible organic solvent which is relatively inert to oxygen under the reaction conditions. A preferred solvent is benzene. The oxygen-containing gas is preferably air which is introduced through an air disperser into the reactor.

In order to obtain high yields of propylene oxide, it is preferable that the concentration of propylene oxide and/or water and/or acids be maintained relatively low in the reaction mixture during the oxidation. This is preferably achieved by continuously withdrawing portions of the reaction mixture from the reactor and stripping the propylene oxide and/or water and/or acids therefrom. The organic mixture, preferably substantially free of propylene oxide and/or water and/or acids, is then recycled back to the reactor after first being preheated to the temperature of the reaction. This continuous separation from the reaction mixture of at least one compound selected from the group consisting of propylene oxide, water and acids, and the recycling of the resulting stripped reaction mixture back to the reactor has several advantages in that (1) the removal of any one, several or all of the aforementioned compounds from the reaction mixture will reduce the rate of hydrolysis of the oxide, which in effect makes it possible to obtain higher propylene oxide yields, and (2) the formation of polymeric materials and other oxygenated by-products is minimized.

The invention will be particularly described in connection with the oxidation of propylene to propylene oxide in the following non-limiting example, the reference numerals indicating the appropriate sections of the flow sheet illustrated in the drawing:

Example I

The solvent, 1500 cc. of benzene and 1.5 grams of manganese propionate catalyst, along with 45 grams of polymer, 3.9 grams of acetaldehyde, 3.9 grams of methanol, 7.9 grams of acetone, and 4.9 grams of methyl formate (simulating by-products of a previous oxidation of the same olefinic compound), were charged to a high pressure reactor 10. The reactor was put under about 300 p. s. i. of nitrogen and then charged with 313 grams of propylene. The reaction mixture was brought up to the operating temperature within the range of 160° C. to 180° C. by means of a heater indicated at 12. The pressure relief valve 16 was then adjusted to maintain a pressure of about 700 p. s. i. At this point, the nitrogen feed was stopped and a steady rate of air feed, between 4 to 5 standard cubic feet per hour, was commenced. Condenser 14 continuously refluxed propylene back to the reactor 10 so as to provide for high conversion of the propylene to oxygenated products.

The reaction mixture was withdrawn from the reactor at a rate of about 500 cc. per hour and the propylene continuously removed by a simple flashing. The liquid phase from the flasher was collected and fractionated. The first cut contained acetaldehyde, methyl formate and propylene oxide. A second cut was taken which included the other products boiling below benzene. The benzene residue from this distillation was washed with water to remove low molecular weight acids and propylene glycol. The volatile products boiling above propylene oxide were recombined with the washed benzene and dried over sodium sulfate. Acetaldehyde and methyl formate equivalent to that produced were added to the dried benzene solution, and this solution was then pumped back into the reactor at a rate of about 450 cc. per hour. Propylene was fed at a rate sufficient to maintain constant concentration and the effluent stream withdrawn at a rate to maintain a fixed level in the reactor. The time elapsed between collecting the effluent and returning it to the reactor was about 12 hours. Therefore, until the effluent solution had been processed to be fed back to the reactor, synthetic mixtures of benzene, polymer, methyl alcohol, acetone, methyl formate and acetaldehyde simulating that produced in a similar oxidation of propylene were fed into the oxidation system.

After termination of the run, the products were recovered by employing well-known separation techniques. The above 84-hour run produced the following materials, the yields of which are indicated as grams of product per 100 grams of hydrocarbon (propylene) consumed:

| | |
|---|---|
| Propylene oxide_____grams__ | 55.2 |
| Propylene glycol_____do____ | 36.1 |
| Acids_____do____ | 41.5 |
| Carbon oxides_____do____ | 55.3 |
| Methyl formate_____do____ | 5.2 |
| Total oxide+glycol yield_____percent__ | 60 |
| Propylene oxide yield_____do____ | 40 |
| Propylene glycol yield_____do____ | 20 |

One preferred method of operating the process on a continuous basis is illustrated in the drawing wherein the condenser 14 continuously refluxes propylene and other products which are recycled back to the bottom of the reactor. Some of the reaction mixture in the reactor 10 is continuously withdrawn and fed to stripper 18 (which may include several conventional stills) so as to provide for the separation of the propylene oxide and/or acids and/or the removal of any small quantities of water that may be present. The unreacted propylene is recycled back to the reactor 10. The thus stripped organic solvent, containing other oxygenated reaction by-products, is also recycled back to the reactor 10 after first being preheated to the temperature of the reaction.

In the above example, polymer, acetaldehyde, methyl formate, acetone and methyl alcohol were initially charged to the reactor in amounts calculated as being produced in a previous oxidation of propylene. However, when operating on a continuous basis, the synthetic mixture of oxygenated by-products simulating that produced in a propylene oxidation run need only be added at the outset of the run. It is also possible to start the reaction at higher temperatures so as to eliminate the addition of the synthetic mixture. In such cases, the temperature of the reaction may be lowered as the by-products are fed back to the reactor.

In order to obtain high yields of propylene oxide, it is necessary to prevent the hydrolysis thereof to propylene glycol during the oxidation. The rate of hydrolysis of propylene oxide under the conditions of the reaction is directly proportional to a hydrolysis constant times the concentration of the water, the acids and propylene oxide present. This may be expressed as:

Rate of hydrolysis $= k[H_2O] [H^+]$ [propylene oxide]

Thus, by keeping the concentration of any one or several or all of the aforementioned compounds relatively low during the oxidation of propylene to propylene oxide, the rate of hydrolysis of propylene oxide is substantially retarded. The concentration of propylene oxide and/or water and/or acids is preferably maintained relatively low in the reaction mixture by continuously withdrawing portions of the reaction mixture from the reactor, stripping any one or several or all of the above mentioned compounds therefrom, and recycling the resulting stripped reaction mixture back to the reactor. The stripping operation makes it possible to obtain higher propylene oxide yields while the recycling of the stripped reaction mixture aids in minimizing the formation of polymeric material and other oxygenated by-products.

While a specific example of the present invention has been given above, it is subject to wide variations without departing from the scope thereof. For example, the manganese propionate is a well-known oxidation catalyst. Other manganese salts or salts or oxides of other metals of variable valence are equally effective.

The range of operating pressures and operating temperatures is quite broad and can be varied within considerable limits. With regard to pressure, it should be pointed out that it is preferably maintained above 300 pounds p. s. i. but that considerably higher pressures may be utilized where design considerations indicate the desirability of such higher pressures. The temperature within the reactor may be varied between about 130° C. and 300° C., the temperature remaining below the critical temperature of the organic solvent in all cases.

The preferable organic solvents are those which (a) are inert to oxygen, (b) are inert to the olefin oxide, (c) will dissolve substantial concentrations of the olefin, and (d) are substantially immiscible with water so as to restrict the quantity of water present in the oxidation zone. Thus the water-immiscible organic solvent admits but very little, or minute, quantities of water into the oxidation zone at any one time so that hydrolysis of the formed oxide to the corresponding glycol is minimized at reaction conditions. While benzene has been illustrated as being a preferred water-immiscible organic solvent, other relatively inert water-immiscible organic solvents can be used such as, for example, toluene, xylene, diphenyl and the like.

The unsaturated hydrocarbon feed stream may also comprise a mixture of an olefin and a saturated hydrocarbon, for example, a mixture of propylene and propane. The quantity of olefin in the feed mixture, however, must be maintained sufficiently high so that the weight percent of olefin present during the oxidation is on the order of about 5 percent. The beneficial effect derived from employing such mixed feed streams has been shown in the copending application, Serial No. 443,037, filed August 13, 1954.

The specific procedure described for the oxidation of propylene to propylene oxide and propylene glycol can be applied to other olefins such as the butylenes, amylenes, hexylenes, heptylenes and octylenes.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. A method of forming propylene oxide by the direct oxidation of propylene with a high yield of oxide per unit of propylene consumed which comprises the steps of dissolving propylene in a liquid hydrocarbon solvent which is inert to oxygen at temperatures on the order of 130° C. to 300° C., passing an elemental-oxygen-containing gas into said solution while said solution is held under pressure to oxidize propylene to propylene oxide, maintaining said solution at a temperature between about 130° C. and 300° C. while said gas passes therethrough, maintaining in said solution a relatively low concentration of at least one compound selected from the group consisting of propylene oxide, acids and water by withdrawing portions of said solution from the oxidation zone, removing at least one compound selected from the group consisting of propylene oxide, acid and water from the withdrawn solution, recycling the resulting solution to the oxidation zone, and recovering propylene oxide.

2. A method according to claim 1 wherein the liquid hydrocarbon solvent is benzene.

3. A method of forming propylene oxide by the direct oxidation of propylene which comprises the steps of dissolving propylene in a liquid hydrocarbon solvent which is inert to oxygen at temperatures on the order of 130° C. to 300° C., passing an elemental-oxygen-containing gas into said solution while said solution is held under pressure to oxidize propylene to propylene oxide, maintaining said solution at a temperature between about 130° C. and 300° C. while said gas passes therethrough, maintaining in said solution a relatively low concentration of propylene oxide by withdrawing portions of said solution from the oxidation zone, removing essentially all of the propylene oxide from the withdrawn solution, and recycling the resulting solution to the oxidation zone.

4. A method of forming propylene oxide by the direct oxidation of propylene which comprises the steps of dissolving propylene in a liquid hydrocarbon solvent which is inert to oxygen at temperatures on the order of 130° C. to 300° C., passing an elemental-oxygen-containing gas into said solution while said solution is held under pressure to oxidize propylene to propylene oxide, maintaining said solution at a temperature between about 130° C. and 300° C. while said gas passes therethrough, maintaining in said solution a relatively low concentration of water by withdrawing portions of said solution from the oxidation zone, removing essentially all of the water from the withdrawn solution, recycling the resulting solution to the oxidation zone, and recovering propylene oxide.

5. A method of forming propylene oxide by the direct oxidation of propylene which comprises the steps of dissolving propylene in a liquid hydrocarbon solvent which is inert to oxygen at temperatures on the order of 130° C. to 300° C., passing an elemental-oxygen-containing gas into said solution while said solution is held under pressure to oxidize propylene to propylene oxide, maintaining said solution at a temperature between about 130° C. and 300° C. while said gas passes therethrough, maintaining in said solution a relatively low concentration of acids by withdrawing portions of said solution from the oxidation zone, removing essentially all of the acids from the withdrawn solution, recycling the resulting solution to the oxidation zone, and recovering propylene oxide.

6. A method of forming propylene oxide by the direct oxidation of propylene which comprises the steps of dissolving propylene in a liquid hydrocarbon solvent which is inert to oxygen at temperatures on the order of 130° C. to 300° C., passing an elemental-oxygen-containing gas through said solution while said solution is held under pressure to oxidize propylene to propylene oxide, maintaining said solution at a temperature between about 130° C. and 300° C. while said gas passes therethrough, maintaining in said solution a relatively low concentration of propylene oxide, acids and water by withdrawing portions of said solution from the oxidation zone, removing essentially all of the propylene oxide, acids and water from the withdrawn solution, and recycling the resulting solution to the oxidation zone.

References Cited in the file of this patent

UNITED STATES PATENTS

| | | |
|---|---|---|
| 2,366,724 | Gardner | Jan. 9, 1945 |
| 2,530,509 | Cook | Nov. 21, 1950 |
| 2,644,837 | Schweitzer | July 7, 1953 |
| 2,650,927 | Gasson | Sept. 1, 1953 |
| 2,741,623 | Millidge et al. | Apr. 10, 1956 |